US010049216B2

(12) United States Patent
Rothman et al.

(10) Patent No.: US 10,049,216 B2
(45) Date of Patent: Aug. 14, 2018

(54) MEDIA PROTECTION POLICY ENFORCEMENT FOR MULTIPLE-OPERATING-SYSTEM ENVIRONMENTS

(71) Applicant: Intel Corporation, Santa Clara, CA (US)

(72) Inventors: Michael A. Rothman, Puyallup, WA (US); Vincent Zimmer, Federal Way, WA (US); Mark S. Doran, Olympia, WA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/298,312

(22) Filed: Jun. 6, 2014

(65) Prior Publication Data
US 2015/0220737 A1    Aug. 6, 2015

Related U.S. Application Data

(60) Provisional application No. 61/936,614, filed on Feb. 6, 2014.

(51) Int. Cl.
*G06F 21/57* (2013.01)
*G06F 21/62* (2013.01)
(Continued)

(52) U.S. Cl.
CPC ............ *G06F 21/572* (2013.01); *G06F 9/441* (2013.01); *G06F 21/604* (2013.01); *G06F 21/6281* (2013.01)

(58) Field of Classification Search
CPC .................................................... G06F 21/572
(Continued)

(56) References Cited

U.S. PATENT DOCUMENTS 6,401,183 B1    6/2002   Rafizadeh
2002/0129274 A1    9/2002   Baskey et al.
(Continued)

FOREIGN PATENT DOCUMENTS

WO    WO0036509 A2    6/2000

OTHER PUBLICATIONS

PC Magazine Encyclopedia, http://www.pcmag.com/encyclopedia/term/43223/firmware, Jan. 22, 2016 and confirmed with definition from May 7, 2013 with archive.org.*

(Continued)

*Primary Examiner* — Jacob Lipman
(74) *Attorney, Agent, or Firm* — Barnes & Thornburg LLP

(57) ABSTRACT

Technologies for media protection policy enforcement include a computing device having multiple operating systems and a data storage device partitioned into a number of regions. During execution of each of the operating systems, a policy enforcement module may intercept media access requests and determine whether to allow the media access requests based on platform media access policies. The media access policies may allow requests based on the identity of the executing operating system, the region of the data storage device, or the requested storage operation. Prior to loading a selected operating system, a firmware policy enforcement module may determine a region of the disk storage device to protect from the selected operating system. The firmware policy enforcement module may configure the data storage device to prevent access to that region. The media access policies may be stored in one or more firmware variables. Other embodiments are described and claimed.

25 Claims, 4 Drawing Sheets

(51) Int. Cl.
*G06F 21/60* (2013.01)
*G06F 9/4401* (2018.01)

(58) Field of Classification Search
USPC .............................................................. 726/1
See application file for complete search history.

(56) References Cited

U.S. PATENT DOCUMENTS

| | | |
|---|---|---|
| 2003/0177239 A1* | 9/2003 | Shinohara ............. G06F 3/0604 709/226 |
| 2005/0144405 A1 | 6/2005 | Doran et al. |
| 2005/0177650 A1 | 8/2005 | Arndt et al. |
| 2009/0292912 A1 | 11/2009 | Kim |
| 2009/0328195 A1 | 12/2009 | Smith |
| 2012/0191960 A1 | 7/2012 | Piwonka et al. |
| 2012/0198193 A1 | 8/2012 | Doran et al. |
| 2014/0006804 A1* | 1/2014 | Tkacik ................... G06F 21/53 713/192 |

OTHER PUBLICATIONS

International Search Report and Written Opinion for Application No. PCT/US2015/013786, dated May 1, 2015, 15 pages.
Office Action, Search Report, and English Translation of R.O.C. Patent Application No. 104100065, dated Sep. 21, 2016, 10 pages.
Office Action, Search Report, and English Translation of R.O.C. Patent Application No. 104100065, dated Dec. 24, 2015, 10 pages.
Office Action and English Translation for Korean Patent Application No. 2016-7018032, dated Feb. 14, 2017, 14 pages.
Extended European Search Report for Application No. 15745775.5, dated Jun. 2, 2017 (8 pages).

* cited by examiner

MEDIA PROTECTION POLICY ENFORCEMENT FOR MULTIPLE-OPERATING-SYSTEM ENVIRONMENTS

CROSS-REFERENCE TO RELATED U.S. PATENT APPLICATION

The present application claims priority under 35 U.S.C. § 119(e) to U.S. Provisional Patent Application Ser. No. 61/936,614, entitled "PARTITION PROTECTION SCHEME FOR A DUAL OS ENVIRONMENT," which was filed on Feb. 6, 2014.

BACKGROUND

Some computing devices ship with multiple operating systems installed by the manufacturer. For example, a computing device may include both a general-purpose operating system such as Microsoft® Windows™ as well as a mobile-oriented operating system such as Android™. In such a multiple-operating-system environment, a product which ships in such a configuration runs the risk of having a user inadvertently deleting "unnecessary" partitions or perturbing data which is not owned by the currently active operating system.

Many computing devices include firmware responsible for hardware initialization, low-level hardware management, and managing the boot process. In particular, in a device with multiple operating systems, during pre-boot the platform firmware may select and load a boot target corresponding to one of the installed operating systems. The main platform firmware responsible for booting the computing device may be implemented according to the Unified Extensible Firmware Interface ("UEFI") specification, which has several versions published by the Unified EFI Forum. The UEFI specification specifies an interface between the firmware of the computing device and the installed operating systems of the computing device.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
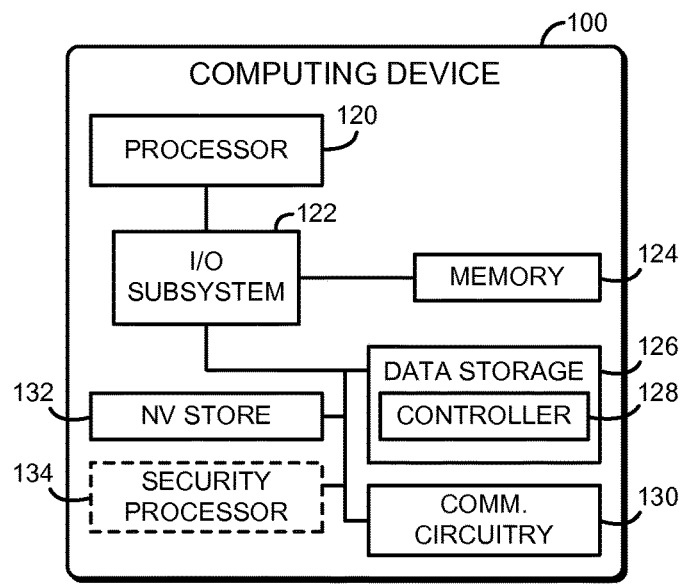
FIG. 1 is a simplified block diagram of at least one embodiment of a computing device for media protection policy enforcement.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C): (A and B); (B and C); or (A, B, and C). Similarly, items listed in the form of "at least one of A, B, or C" can mean (A); (B); (C): (A and B); (B and C); or (A, B, and C).

The disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, in one embodiment, a computing device 100 may boot, toggle between, or otherwise execute multiple operating systems. The computing device 100 may also include data storage that is partitioned or otherwise divided into parts that may be assigned to each of the operating systems. The computing device 100 controls access to the data storage partitions according to one or more platform media access policies that may be established by the platform manufacturer, or in some embodiments, configured by an end user. In some embodiments, during execution, the computing device 100 may intercept media access requests and determine whether to allow or deny the requests based on the media access policies. Additionally or alternatively, in some embodiments the computing device 100 may protect various data storage partitions by configuring the data storage controller based on the media access policies prior to booting an operating system. Enforcing media access policies may protect the computing device 100 from inadvertent (or malicious) damage caused by user modification of data partitions that are not controlled by the currently executing operating system. Accordingly, enforcing media access policies may improve the user experience and/or reduce manufacturer support costs while allowing manufacturers to ship devices with multiple operating systems.

The computing device 100 may be embodied as any type of device for performing the functions described herein. For example, the computing device 100 may be embodied as, without limitation, a smart phone, a tablet computer, a laptop computer, a notebook computer, a mobile computing device, a cellular telephone, a handset, a messaging device, a wearable computing device, a vehicle telematics device, a desktop computer, a server computer, a workstation, a distributed computing system, a multiprocessor system, a consumer electronic device, and/or any other computing device configured to perform the functions described herein. As shown in FIG. 1, the illustrative computing device 100 includes a processor 120, an input/output subsystem 122, a memory 124, and a data storage device 126. Of course, the computing device 100 may include other or additional components, such as those commonly found in a mobile and/or stationary computers (e.g., various input/output devices), in other embodiments. Additionally, in some embodiments, one or more of the illustrative components may be incorporated in, or otherwise form a portion of, another component. For example, the memory 124, or portions thereof, may be incorporated in the processor 120 in some embodiments.

The processor 120 may be embodied as any type of processor capable of performing the functions described herein. For example, the processor 120 may be embodied as a single or multi-core processor(s), digital signal processor, microcontroller, or other processor or processing/controlling circuit. Similarly, the memory 124 may be embodied as any type of volatile or non-volatile memory or data storage capable of performing the functions described herein. In operation, the memory 124 may store various data and software used during operation of the computing device 100 such as operating systems, applications, programs, libraries, and drivers. The memory 124 is communicatively coupled to the processor 120 via the I/O subsystem 122, which may be embodied as circuitry and/or components to facilitate input/output operations with the processor 120, the memory 124, and other components of the computing device 100. For example, the I/O subsystem 122 may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations. In some embodiments, the I/O subsystem 122 may form a portion of a system-on-a-chip ("SoC") and be incorporated, along with the processor 120, the memory 124, and other components of the computing device 100, on a single integrated circuit chip.

The data storage device 126 may be embodied as any type of device or devices configured for short-term or long-term storage of data such as, for example, memory devices and circuits, memory cards, hard disk drives, solid-state drives, or other data storage devices. The data storage device 126 may be logically divided into a number of partitions. For example, the data storage device 126 may include a system partition that stores data and firmware code for the computing device 100. The data storage device 126 may also include a number of operating system partitions that store data files and executables for each operating system of the computing device 100. Additionally, the data storage device 126 includes a controller 128. The controller 128 may be embodied as a microcontroller, microprocessor, or any other control logic capable of controlling or enabling access to the data storage device 126 by the rest of the computing device 100. In some embodiments, the controller 128 may be capable of denying access to particular logical block addresses, sectors, tracks, or other address ranges within the data storage device 126. It should be noted that although the illustrative computing device 100 includes a single data storage device 126 divided into multiple logical partitions, this disclosure is also applicable to computing devices 100 including multiple data storage devices 126.

The computing device 100 further includes a communication circuit 130, which may be embodied as any communication circuit, device, or collection thereof, capable of enabling communications between the computing device 100 and other remote devices. The communication circuit 130 may be configured to use any one or more communication technology (e.g., wireless or wired communications) and associated protocols (e.g., Ethernet, Bluetooth®, Wi-Fi®, WiMAX, etc.) to effect such communication. The communication circuit 130 may be embodied as a network adapter, including a wireless network adapter.

The computing device 100 also includes a non-volatile ("NV") store 132. The NV store 132 may be embodied as any device configured for persistent storage of data when the computing device 100 is powered down or disconnected from a power supply. In the illustrative embodiment, the NV store 132 is a flash memory chip. In other embodiments, the NV store 132 may be embodied as a small amount of complementary metal-oxide semiconductor ("CMOS") memory coupled with a battery backup or other non-volatile memory. The NV store 132 may be used to store platform firmware for the computing device 100, as well as firmware configuration variables such as configuration settings, boot targets, and other information that should persist across reboots. The NV store 132 typically has a relatively small storage capacity compared to the data storage device 126, but is available to the computing device 100 upon initial boot during a pre-boot firmware execution environment. In some embodiments, the NV store 132 may be incorporated into one or more other components of the computing device 100, for example into the I/O subsystem 122.

In some embodiments, the computing device 100 may also include a security processor 134. The security processor 134 may be embodied as any hardware and associated firmware or software configured to enhance the security and/or trustworthiness of the computing device 100. For example, the security processor 134 may be embodied as a trusted platform module ("TPM"). In some embodiments, the security processor 134 may form part of the I/O subsystem 122. The security processor 134 may be used to security authenticate and/or verify platform firmware variables or other configuration data of the computing device 100.

Figure 2:
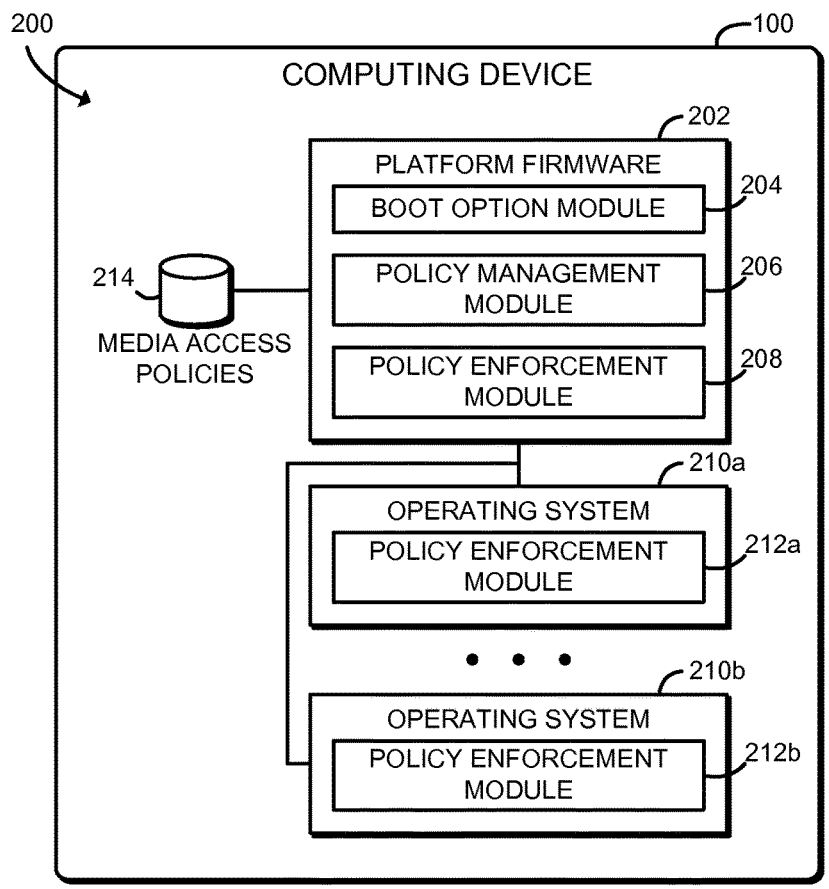
FIG. 2 is a simplified block diagram of at least one embodiment of an environment of the computing device of the system of FIG. 1.

Referring now to FIG. 2, in some embodiments, the computing device 100 establishes an environment 200 during operation. The illustrative environment 200 includes platform firmware 202 and a number of operating systems 210. The illustrative environment 200 includes two operating systems 210a and 210b; however, in other embodiments additional operating systems 210 may be included.

The platform firmware 202 includes a boot option module 204, a policy management module 206, and a policy enforcement module 208. The various modules of the platform firmware 202 may be embodied as hardware, firmware, software, or a combination thereof. The boot option module 204 is configured to execute in a pre-boot firmware environment. The boot option module 204 selects an operating system 210 from among the installed operating systems 210 and loads the selected operating system 210. The boot option module 204 may, for example, select and load a boot target as specified by the UEFI specification.

The policy management module 206 is configured to store, manage, and control access to one or more media access policies 214. The media access policies 214 may define platform-specific rules for access to partitions of the data storage device 126, including whether to enable media access protection, whether to deny access to a partition by an operating system 210 that does not own that partition, whether to selectively allow access to a partition by an operating system 210 that does not own that partition, whether to allow access to shared partitions, and other access rules. The media access policies 214 may be embodied using any nonvolatile storage of the computing device 100. For example, in some embodiments, the media access policies 214 may be embodied as one or more firmware variables stored in the NV store 132. The policy management module 206 may be configured to allow access to the media access policies 214 by a currently executing operating system 210, for example by establishing a firmware variable interface as specified by the UEFI specification. In some embodiments, the policy management module 206 may be configured to verify, authenticate, or otherwise secure access to the media access policies 214. For example, the policy management module 206 may store the media access policies 214 as one or more UEFI Authenticated Variables, as described by the UEFI specification published by the UEFI Forum, or other secure storage, such as a Trusted Platform Module (TPM) NVData, as described by the TPM specification published by the Trusted Computing Group.

The policy enforcement module 208 of the platform firmware 202 is configured to identify one or more regions of the data storage device 126 that are to be protected from the selected operating system 210. For example, the policy enforcement module 208 may determine that a partition owned by a different operating system 210 is to be protected from the selected operating system 210. The policy enforcement module 208 configures the data storage device 126 to prevent access to the protected region(s) prior the operating system 210 being booted. For example, the policy enforcement module 208 may program, configure, or otherwise instruct the controller 128 of the data storage device 126 to prevent access to certain storage addresses or storage address ranges.

Each of the operating systems 210 includes a policy enforcement module 212. Each policy enforcement module 212 may be embodied as hardware, firmware, software, or a combination thereof. Each policy enforcement module 212 is configured to intercept media access requests issued during execution of the operating system 210, determine whether to allow the media access requests based on the media access policies 214, and then allow or deny the media access requests as appropriate. Each media access request may specify a storage operation (e.g., read, write, create, delete, stat, etc.) and a storage address or address range. The policy enforcement module 212 may determine whether to allow or deny the media access request based on any combination of the identity of the currently executing operating system 210, the identity, format, or ownership of the affected region of the data storage device 126, the specified storage operation, or any other criteria specified by the media access policies 214. In some embodiments, the policy enforcement module 212 may be embodied as a filter driver embedded in the storage driver stack of the operating system 210, as further described below in connection with FIGS. 4 and 5.

Figure 3:
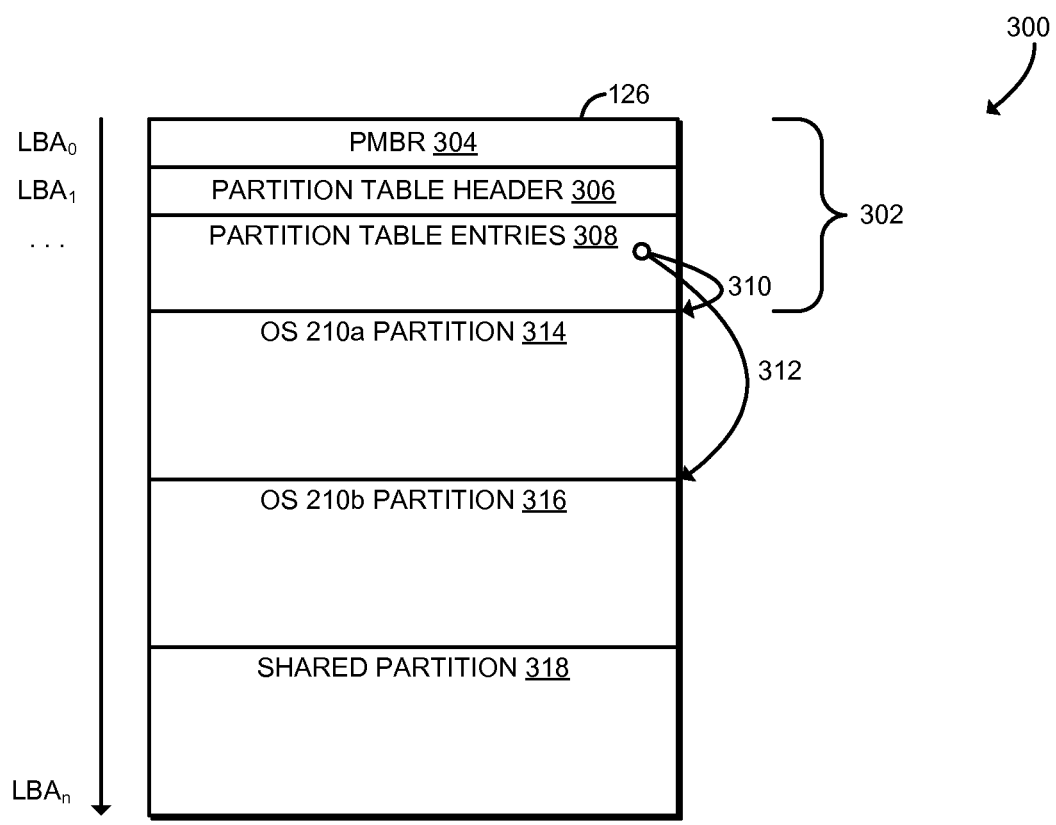
FIG. 3 is a schematic diagram of an illustrative partitioning scheme of a data storage device of the computing device of FIGS. 1 and 2.

Referring now to FIG. 3, the schematic diagram 300 illustrates one embodiment of a partitioning scheme of the data storage device 126 that may be employed by the computing device 100. Of course, in many embodiments the data storage device 126 may include a different number or type of partitions and/or a different partitioning scheme. In the illustrative example, the data storage device 126 may include a number of blocks that are each individually addressable by a logical block address ("LBA"). Each LBA may be embodied as a simple integer that ranges from zero to the maximum block number of the data storage device 126. Each block may include a predetermined amount of data, such as 512 bytes of data or 4096 bytes of data. The illustrative data storage device 126 is divided into a partition table 302 and three data partitions 314, 316, 318.

The partition table 302 starts in the first block of the data storage device 126, that is, in the block having an LBA of zero. The illustrative partition table 302 includes a protective master boot record ("PMBR") 304, a partition table header 306, and a number of partition table entries 308. The PMBR 304 may be embodied as a legacy master boot record included in the first block of the data storage device 126 (i.e., LBA zero) for compatibility purposes. The partition table header 306, starting at the second block of the data storage device 126 (e.g., LBA one), may define the size, type, and other attributes of the partition table 302. Each partition table entry 308 may define the location, size, type, and other attributes of the partitions 314, 316, 318. For example, each partition table entry 308 may include pointers containing LBAs corresponding to the start and end of each of the data partition 314, 316, 318. Illustrative pointers 310, 312 include LBA values corresponding to the start address and end address of the partition 314, respectively. The partition table entries 308 may further include pointers corresponding to the partitions 316, 318, which are omitted from the diagram 300 for clarity. As another example, each partition table entry 308 may include a globally-unique identifier corresponding to the type of the associated data partition 314, 316, 318. The data partition type may indicate what operating system 210a, 210b owns the data partition 314, 316, 318.

Each data partition may be owned by a particular operating system 210 or shared by multiple operating systems 210. In the illustrative example, the partition 314 is owned by the operating system 210a, the partition 316 is owned by the operating system 210b, and the partition 318 is shared by both operating systems 210a, 210b. For example, consider that the operating system 210a is Microsoft® Windows™ and the operating system 210b is Android™. In that example, the partition 314 may be embodied as Windows data partition, the partition 316 may embodied an Android system partition, and the partition 318 may be embodied as a data partition shared by Windows™ and Android™.

As further described below, the computing device 100 may control access to the partition table 302 and/or the partitions 314, 316, 318 based on the media access policies 214. For example, the media access policies 214 may indicate whether media access protection should be enabled. If enabled, in some embodiments the media access policies 214 may specify that an operating system 210 may access only partitions owned by the operating system 210 or shared with the operating system 210. In the illustrative example, the operating system 210a may be allowed to access the partitions 314, 318 but not the partition 316, and the operating system 210b may be allowed to access the partitions 316, 318 but not the partition 314. As another example, both operating systems 210a, 210b may be denied access to the partition table 302. Additionally or alternatively, in some embodiments the media access policies 214 may allow selective or read-only access by an operating system 210 to partitions not owned by that operating system 210. In the illustrative example, the operating system 210a may be allowed read-only access to the partition 316 and the operating system 210b may be allowed read-only access to the partition 318. Of course, those media access policies 214 are merely illustrative and other policies may be employed in other embodiments.

Figure 4:
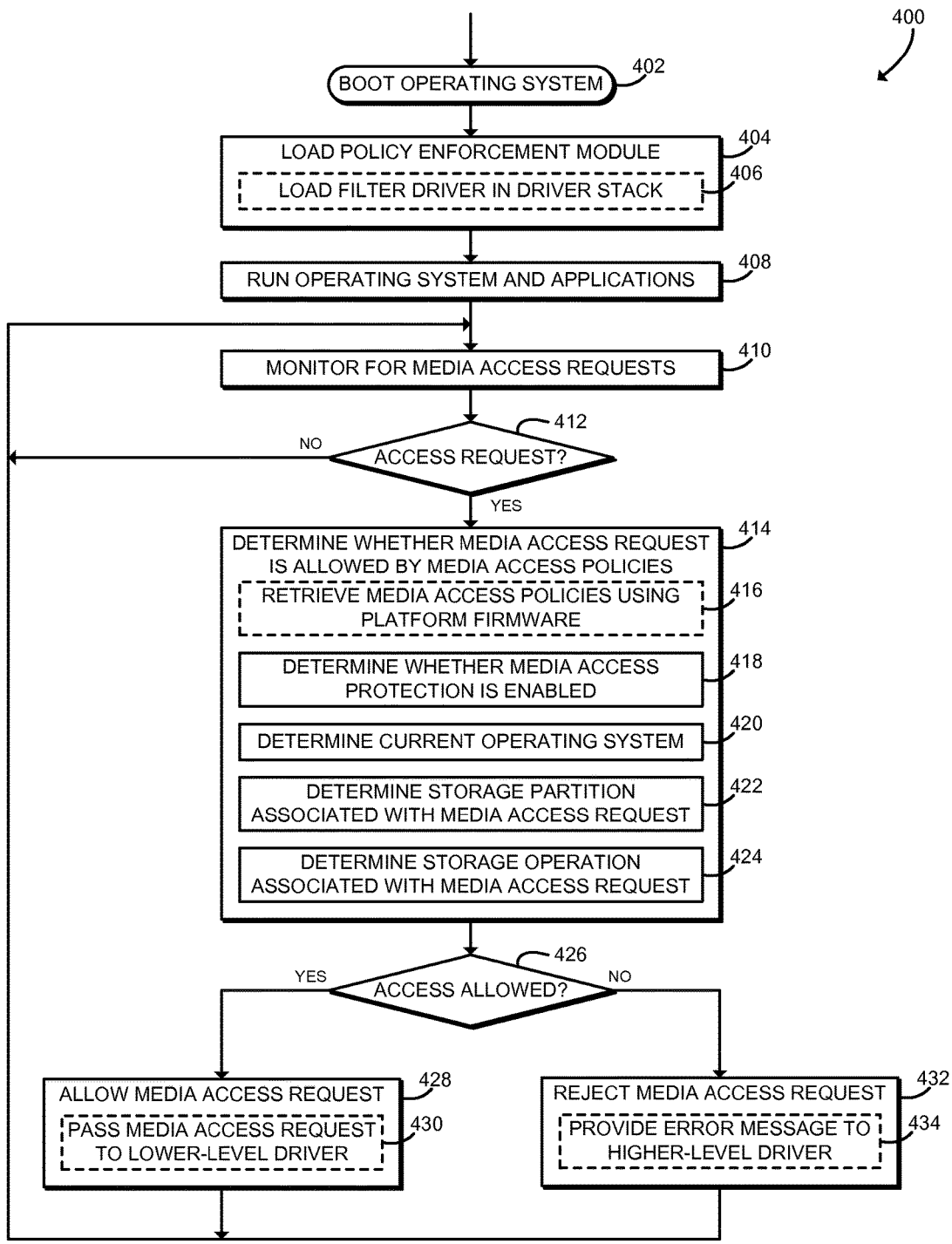
FIG. 4 is a simplified flow diagrams of at least one embodiment of a method for media protection policy enforcement that may be executed by the computing device of FIGS. 1 and 2.

Referring now to FIG. 4, in use, the computing device 100 may execute a method 400 for media protection policy enforcement. The method 400 begins with block 402, in which the computing device 100 boots an operating system 210. As further described below in connection with FIG. 6, the computing device 100 may select the operating system 210 to be booted from within a pre-boot firmware execution environment. The firmware execution environment may be terminated by, for example, calling the UEFI function ExitBootServices( ). After booting the operating system 210, the computing device 100 is under control of the operating system 210. In some embodiments, the platform firmware 202 may still provide limited services after booting the operating system 210. For example, the platform firmware 202 may provide read-only access to firmware variables maintained in the NV store 132.

Figure 5:
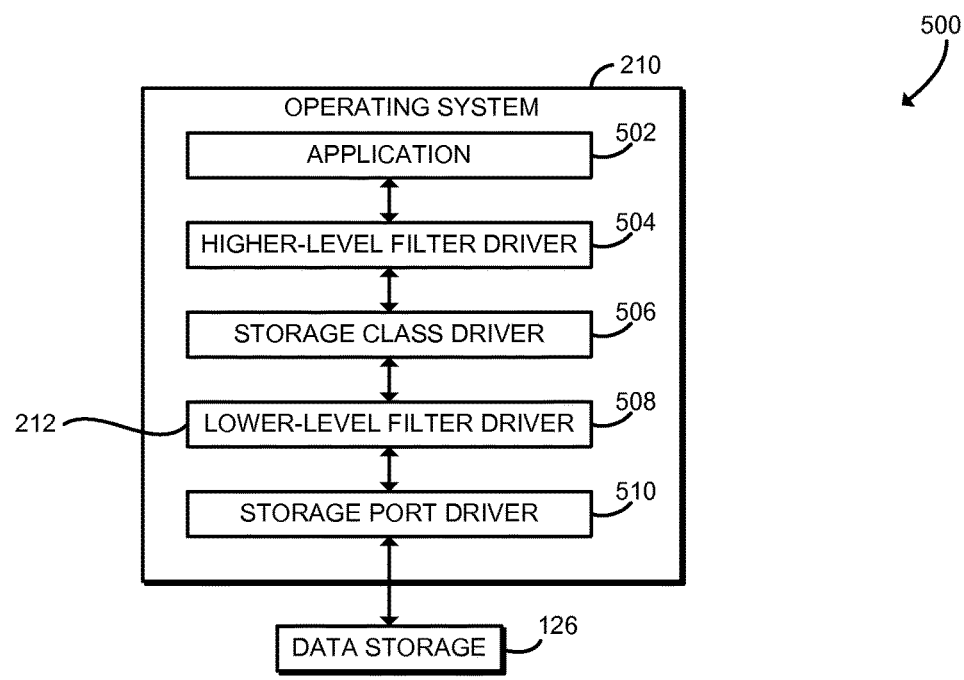
FIG. 5 is a schematic diagram of a storage driver stack that may be established by the computing device of FIGS. 1 and 2.

In block 404, the computing device 100 may load the policy enforcement module 212. As described above, each operating system 210 may be configured to load a particular policy enforcement module 212. The computing device 100 may use any technique to prepare the policy enforcement module 212 to monitor and/or intercept media access requests, such as loading a kernel driver module or loading a user-mode executable. In some embodiments, in block 406, the computing device 100 may load the policy enforcement module 212 as a filter driver in a storage driver stack of the operating system 210. An illustrative storage driver stack 500 including multiple filter drivers is shown in FIG. 5.

Many operating systems 210 access data storage devices 126 through a layered storage stack, with each layer responsible for a particular level of abstraction of the data storage device 126. The illustrative storage driver stack 500 includes, from the highest level to the lowest level, an application 502, a higher-level filter driver 504, a storage class driver 506, a lower-level filter driver 508, and a storage port driver 510. The application 502 may be embodied as a user-level application, kernel process, higher-level driver, or other process that may access data on the data storage device 126. The application 502 issues media access requests to lower-level members of the storage stack. For example, the application 502 may issue requests using a file access API, a block access API, or any other storage interface established by the operating system 210.

The storage class driver 506 may receive media access requests originating from the application 502 and transform the media access requests into lower-level requests, for example, into requests specifying storage addresses in terms of logical block addresses. The operating system 210 may establish a storage class driver 506 for each type of data storage device 126 usable by the computing device 100, for example a storage class driver 506 for each of disks, removable optical discs, tape drives, or other device types. The storage port driver 510 may receive lower-level media access requests originating from the storage class driver 506 and transform the media access requests into lower-level media access requests that may be transmitted to the data storage device 126 across the appropriate interconnect bus. For example, the storage port driver 510 may generate media access requests that are appropriate for the particular bus protocol implemented by the data storage device 126. The operating system 210 may establish a storage port driver 510 for each interconnect bus that may attach the data storage device 126 to the computing device 100, for example for the ATA, SCSI, or USB buses.

The filter drivers 504, 508 may intercept media access requests issued from a higher-level member of the storage driver stack. After interception, the filter drivers 504, 508 may allow the intercepted media access requests to pass through to the lower-level members of the storage driver stack, modify the media access requests prior to passing them to the lower-level members of the storage stack, or reject the media access requests by returning an error to the higher-level member of the storage driver stack. Typically, each filter driver 504, 508 may implement the same interface as another other member of the storage driver stack, allowing functionality to be added transparently to the storage driver stack. In the illustrative embodiment, the policy enforcement module 212 is implemented as a lower-level filter driver 508. Thus, the policy enforcement module 212 may intercept lower-level media access requests that include logical block addresses for each request. Additionally or alternatively, in other embodiments the policy enforcement module 212 may be embodied in any level of the storage driver stack below the application 502, that is, embodied as or as part of a higher-level filter driver 504, a storage class driver 506, a lower-level filter driver 508, and/or a storage port driver 510.

Referring back to FIG. 4, after loading the policy enforcement module 212, in block 408 the computing device 100 runs the selected operating system 210 and any associated applications 502. In block 410, the computing device 100 monitors for media access requests. A media access request may specify a storage operation (e.g., read, write, create file or block, delete file or block, request information, etc.) and a particular storage address or range of storage addresses associated with the storage operation (e.g., one or more logical block addresses). The media access requests may be generated by any application, process, thread, higher-level driver, or other entity executing on the computing device 100. The media access requests may be generated in response to a user request, for example by an interactive application, or may be generated without user interaction. As described above, the media access requests may be intercepted as they progress through the storage driver stack, for example by a filter driver 504, 508. In block 412, the computing device 100 determines whether any media access requests have been received. If not, the method 400 loops back to block 410 to continue monitoring for media access requests. If one or more media access requests have been received, the method 400 advances to block 414.

In block 414, the computing device 100 determines whether the media access request is allowed by the media access policies 214. In some embodiments, in block 416 the computing device 100 may retrieve one or more of the media access policies 214 using the platform firmware 202. For example, the media access policies 214 may be stored as one or more firmware variables using the NV store 132. The computing device 100 may access those firmware variables using a runtime firmware variable interface provided by the platform firmware 202. In some embodiments, the media access policies 214 may be embodied as an encrypted, signed, or otherwise secured firmware variable. For example, the media access policies 214 may be embodied as one or more UEFI authenticated variables as specified by the UEFI specification.

Securing or otherwise authenticating access to the media access policies 214 may allow device vendors to retain control over configuration changes to the computing device 100 after the computing device 100 is provided to an end user. For example, consider an embodiment in which the media access policies 214 are stored as firmware variables in the NV store 132. In that example, the media access policies 214 may be modified only through a physically-present local user interface ("UI") provided by the platform firmware 202, such as a graphical BIOS system. Thus, the platform firmware 202 may provide proof-of-presence-qualified configuration of the media access policies 214. In such embodiments, the platform firmware 202 may lock the media access policies 214 prior to execution of untrusted firmware drivers, firmware applications, option ROMs, or operating system loaders. Thus, in those embodiments the media access policies 214 may be read-only during the untrusted portions of the pre-boot firmware execution environment (e.g., after the end of the UEFI Driver eXecution Environment ("DXE")) and during untrusted operating system 210 runtime.

As another example, consider an embodiment in which the media access policies 214 are stored as authenticated firmware variables in the NV store 132, for example as UEFI variables with the Authenticated Write attribute bit. In that example, the media access policies 214 may be accessed and updated at runtime during execution of an untrusted operating system 210. However, updates to the media access policies 214 may only be allowed by authenticated users or other entities. In those embodiments, access to the media access policies 214 may be authenticated, verified, or otherwise secured using public key cryptography, for example by signing the authenticated firmware variable using the creator's public/private key pair.

As a third example, in some embodiments the media access policies 214 may be secured using the security processor 134 of the computing device 100. For example, the media access policies 214 may be stored in a secure storage area of the computing device 100 that is controlled by a TPM.

Still referring to FIG. 4, in block 418, the computing device 100 may determine whether media access protection is enabled. The media access request may be allowed without further analysis if media access protection is not enabled. In some embodiments, one or more of the media access policies 214 may specify whether or not media access protection is enabled. In block 420, the computing device 100 may determine the identity of the currently executing operating system 210. The determination of whether to allow the media access request or not may depend on the identity of the currently executing operating system 210. In some embodiments, the identity of the currently executing operating system 210 may be implicitly known to the policy enforcement module 212. For example, in many embodiments each operating system 210 may include a dedicated policy enforcement module 212 such as a particular filter driver 504, 508. In those embodiments, the identity of the operating system 210 may be hard-coded, assumed, or otherwise implicit to the particular policy enforcement module 212 in use.

In block 422, the computing device 100 may determine the storage partition associated with the particular media access request. For example, the computing device 100 may determine the identity of the storage partition that contains the storage addresses included in the media access request. As described above, each storage partition may be owned by or assigned to one or more operating system 210. To illustrate, referring back to FIG. 3, the computing device 100 may determine whether the media access request references the operating system 210a partition 314, the operating system 210b partition 316, the shared partition 318, or in some embodiments, the partition table 302. In block 424, the computing device 100 may determine the storage operation associated with the media access request. For example, the computing device 100 may determine whether the storage request is a read request, write request, create request, delete request, information request, or other request. In some embodiments, the determination of whether to allow the media access request may depend on the specified storage operation.

In block 426, the computing device 100 determines whether to allow the media access request based on the media access policies 214. The determination of whether to allow the media access request may be based on any combination of the identity of the currently executing operating system 210, the storage partition associated with the request, the storage operation associated with the request, and/or other criteria specified by the media access policies 214. For example, the computing device 100 may allow all accesses to storage partitions owned by the currently executing operating system 210. As another example, the computing device 100 may deny all accesses to storage partitions that are not owned by the currently executing operating system 210. As a third example, the computing device 100 may allow all accesses to storage partitions that are shared between the currently executing operating system 210 and one or more other operating systems 210. As a fourth example, the computing device 100 may allow only read access to the partition table of the data storage device 126. In some embodiments, the determination of whether to allow accesses to storage partitions that are not owned by the currently executing operating system 210 may depend on the media access policies 214, which may be defined by the platform manufacturer, end user, or other party. For example, based on the content of the media access policies 214, the computing device 100 may allow read access to storage partitions that are not owned by the currently executing operating system 210 but deny write access to storage partitions that are not owned by the currently executing operating system 210. If the media access request is allowed, the method 400 branches to block 428. If the media access request is not allowed, the method 400 branches to block 432, described below.

In block 428, the computing device 100 allows the media access request to proceed. In some embodiments, in block 430 the computing device 100 may pass the media access request through to a lower-level member of the storage driver stack. For example, if the policy enforcement module 212 is embodied as a lower-level filter driver 508, the media access request may be passed down to a storage port driver 510, allowing the media access request to proceed as normal. After the request is allowed, the data storage device 126 may perform the requested storage operation and return data or status information back up the storage driver stack, ultimately to the application 502. After allowing the media access request, the method 400 loops back to block 410 to continue monitoring media access requests.

Referring back to block 426, if the media access request is not allowed, the method 400 branches to block 432. In block 432, the computing device 100 rejects the media access request. The computing device 100 may, for example, prevent the media access request from being passed down to a lower-level member of the storage driver stack. In some embodiments, in block 434 the computing device 100 may return an informative error message to a higher-level member of the storage driver stack, such as the application 502. For example, the computing device 100 may return an "access denied," "write protected," "invalid operation," or other appropriate error message. In some embodiments, the error message may be displayed to the user, allowing the user to determine why the media access request failed. After rejecting the media access request, the method 400 loops back to block 410 to continue monitoring for media access requests.

Figure 6:
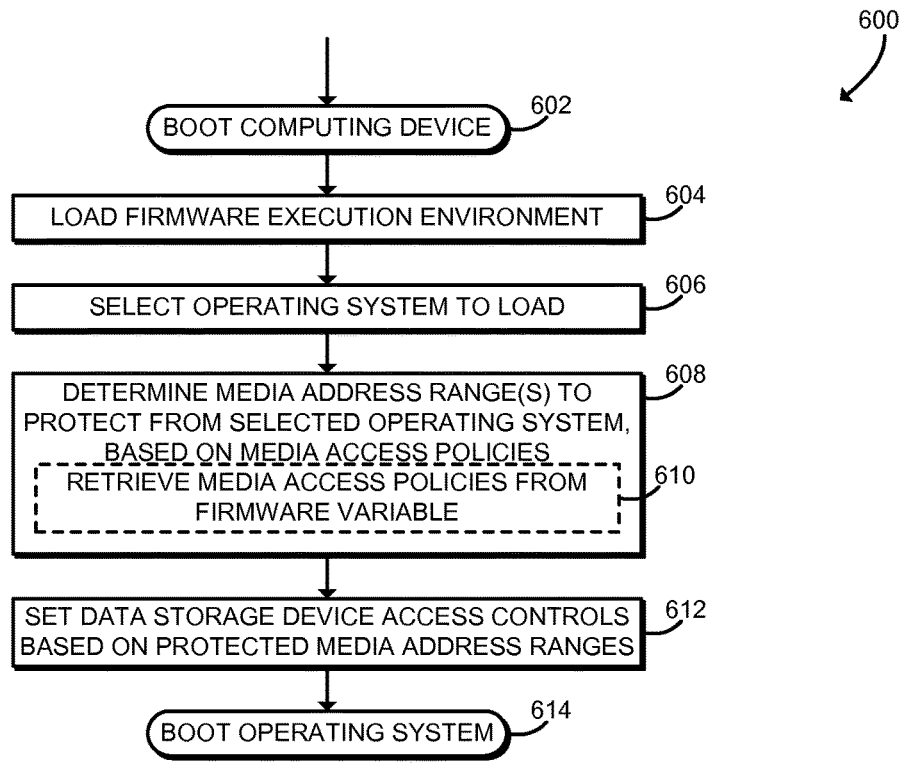
FIG. 6 is a simplified flow diagram of at least one embodiment of a firmware method for media protection policy enforcement that may be executed by the computing device of FIGS. 1 and 2.

Referring now to FIG. 6, in use, the computing device 100 may execute a method 600 for media protection policy enforcement. The method 600 begins with block 602, in which the computing device 100 boots. The computing device 100 may boot in response to the user powering on or rebooting the computing device 100, in response to resuming the computing device 100 from a low-power sleep or hibernate state, or in other circumstances when the computing device 100 is initialized. In some embodiments, the computing device 100 may boot or reboot in response to the user directing the computing device 100 to switch operating systems 210, for example by selecting a software or hardware toggle.

In block 604, the computing device 100 loads a pre-operating-system firmware execution environment. The firmware execution environment may be embodied as, for example, a driver execution environment as specified by the UEFI specification. In the firmware execution environment, the platform firmware 202 is in full control of the computing device 100. Within the firmware execution environment, the computing device 100 initializes platform hardware and otherwise prepares the computing device 100 for use. The computing device 100 may load and start firmware images for one or more firmware drivers or firmware applications. Firmware drivers and applications may be embodied as binary images that may provide pre-boot initialization and other services. Additionally, in some embodiments, the firmware drivers and applications may install firmware protocol interfaces or other services that remain resident and provide services to the computing device 100 during execution of an operating system 210. For example, a firmware protocol interface may be installed to allow access to one or more firmware variables stored in the NV store 132.

In block 606, the computing device 100 selects an operating system 210 to load from the operating systems 210 that are installed on the computing device 100. The particular operating system 210 selected may depend on a user selection, a default boot order, or any other criteria for selection. In some embodiments, the computing device 100 may select a boot target associated with the selected operating system 210. The boot target may be embodied as a firmware application that will be loaded and started by the computing device 100, such as an operating system loader or a diagnostic, maintenance, or management application.

In block 608, the computing device 100 determines one or more media address ranges to protect from the selected operating system 210 based on the media access policies 214. In particular, the computing device 100 may determine that the operating system 210 may not access logical block address range(s) associated with storage partitions that are not owned by the operating system 210 and/or shared with the operating system 210. For example, the computing device 100 may determine that a logical block address range associated with a storage partition that is owned by a different operating system 210 should be protected from the selected operating system 210. Of course, in some embodiments the computing device 100 may additionally or alternatively determine media address ranges that are to be accessible to the operating system 210. For example, the computing device 100 may determine that a data partition owned by the operating system 210 may be accessed by the operating system 210. In some embodiments, in block 610, the computing device 100 may retrieve the media access policies 214 from one or more firmware variables. As described above, the firmware variables may be stored in the NV store 132. The firmware variables may determine whether, for example, media access protection has been enabled, whether to allow accesses to partitions not owned by the selected operating system 210, or any other access policy.

As an illustration, referring again to FIG. 3, assume that the computing device 100 selects the operating system 210a as described above in connection with block 606. The computing device 100 may determine that the operating system 210a may not access data addresses within the partition 316, which is owned by the operating system 210b. In some embodiments, the computing device 100 may determine that the operating system 210a may be allowed access to data addresses within the partition 314.

In block 612, the computing device 100 sets data access controls of the data storage device 126 based on the protected media address ranges determined as described above in block 608. In some embodiments, the computing device 100 may program, command, or otherwise instruct the controller 128 of the data storage device 126 to reject accesses that are within the protected media address ranges. For example, the computing device 100 may program a sector range protection feature of the controller 128 to prevent access to the protected media address ranges. Of course, in some embodiments, the computing device 100 may program, command, or otherwise instruct the controller 128 of the data storage device 126 to allow accesses that are within specified media address ranges. The computing device 100 may determine whether to specify the protected media address ranges or to specify allowed media address ranges based on the capabilities of the controller 128. After setting data access controls, any process executing on the computing device 100, including any operating system 210, may be incapable of accessing media addresses within the protected media address ranges. The data access controls of the data storage device 126 may be reset when the computing device 100 is rebooted, power cycled, or otherwise reset.

In block 614, the computing device 100 boots the selected operating system 210. As described above, the firmware execution environment may load and execute a boot target associated with the selected operating system 210. During execution, the selected operating system 210 may be incapable of accessing media addresses within the protected media address ranges. Thus, in use, the operating system 210 may be completely unaware of storage partitions owned by other operating systems 210.

After booting the operating system 210, the computing device 100 may monitor media access requests using a policy enforcement module 212 associated with that operating system 210, for example by executing the method 400 described above in connection with FIG. 4. Thus, the methods 400, 600 are complementary. A computing device 100 may execute each method 400, 600 independently or may execute both methods 400, 600 in combination. For example, a computing device 100 with a hardware controller 128 that supports sector range protection may execute the method 600 during the pre-boot firmware environment and the method 400 after booting the operating system 210. Additionally or alternatively, such a computing device 100 with a hardware controller 128 that supports sector range protection may execute the only method 600 and not the method 400, for example when executing an operating system 210 without a policy enforcement module 212. Additionally or alternatively, a computing device 100 without a hardware controller 128 supporting sector range protection may execute the method 400 during execution of the operating system 210 and not the method 600.

Additionally or alternatively, when executed on the same computing device 100, each of the methods 400, 600 may enforce different media access policies 214. For example, the method 600 may enforce media access policies 214 to completely deny access to partitions not owned by the selected operating system 210 using the hardware controller 128. Continuing that example, the method 400 may enforce media access policies 214 that allow selective or read-only access to shared partitions of the data storage device 126.

EXAMPLES

Illustrative examples of the technologies disclosed herein are provided below. An embodiment of the technologies may include any one or more, and any combination of, the examples described below.

Example 1 includes a computing device for media protection policy enforcement in a multiple-operating-system environment, the computing device comprising a data storage device comprising a plurality of regions; and a policy enforcement module to: intercept, during execution of an operating system of the computing device, a media access request, wherein the media access request specifies a storage operation and a storage address; determine an identity of the operating system of the computing device; identify a region of the data storage device that includes the storage address of the media access request; and determine whether to allow the media access request as a function of (i) the identified region of the data storage device, (ii) the identity of the operating system, and (iii) the storage operation of the media access request.

Example 2 includes the subject matter of Example 1, and wherein to determine whether to allow the media access request comprises to determine whether the region of the data storage device is owned by the operating system; and determine to allow the media access request in response to a determination that the region is owned by the operating system.

Example 3 includes the subject matter of any of Examples 1 and 2, and wherein to determine whether to allow the media access request further comprises to determine not to allow the media access request in response to a determination that the region is not owned by the operating system.

Example 4 includes the subject matter of any of Examples 1-3, and wherein to determine whether to allow the media access request further comprises to determine whether to allow the media access request as a function of a media access policy of the computing device in response a determination that the region is not owned by the operating system.

Example 5 includes the subject matter of any of Examples 1-4, and wherein to determine whether to allow the media access request as a function of the media access policy comprises to read the media access policy from a nonvolatile store of the computing device using a firmware environment of the computing device.

Example 6 includes the subject matter of any of Examples 1-5, and wherein to determine whether to allow the media access request as a function of the media access policy comprises to determine whether the region of the data storage device is shared by the operating system and a second operating system, wherein the second operating system is not to execute during the determination; and determine to allow the media access request in response to a determination the region is shared.

Example 7 includes the subject matter of any of Examples 1-6, and wherein to determine whether to allow the media access request as a function of the media access policy comprises to determine whether to allow the media access request as a function of the storage operation of the media access request.

Example 8 includes the subject matter of any of Examples 1-7, and wherein to determine whether to allow the media access request as a function of the storage operation of the media access request comprises to determine to allow the media access request in response to the media access request comprising a read operation; and determine not to allow the media access request in response to the media access request comprising a write operation.

Example 9 includes the subject matter of any of Examples 1-8, and wherein to determine whether to allow the media access comprises to read a media access policy from a nonvolatile store of the computing device using a firmware environment of the computing device.

Example 10 includes the subject matter of any of Examples 1-9, and wherein to determine whether to allow the media access comprises to determine whether media access protection is enabled as a function of the media access policy; and determine whether to allow the media access in response to a determination that media access protection is enabled.

Example 11 includes the subject matter of any of Examples 1-10, and further including a second policy enforcement module to intercept, during execution of a second operating system of the computing device, a second media access request, the media access request to specify a second storage operation and a second storage address; determine an identity of the second operating system; identify a second region of the data storage device that includes the second storage address of the second media access request; and determine whether to allow the second media access request as a function of the second region of the data storage device, the identity of the second operating system, and the second storage operation of the second media access request.

Example 12 includes the subject matter of any of Examples 1-11, and wherein the policy enforcement module comprises a filter driver of the computing device.

Example 13 includes the subject matter of any of Examples 1-12, and wherein the policy enforcement module is further to pass the media access request through to a lower-level driver of the computing device in response to a determination to allow the media access request.

Example 14 includes the subject matter of any of Examples 1-13, and wherein the policy enforcement module is further to reject the media access request in response to a determination not to allow the media access request.

Example 15 includes the subject matter of any of Examples 1-14, and wherein the region of the data storage device comprises a partition of the data storage device.

Example 16 includes the subject matter of any of Examples 1-15, and wherein the region of the data storage device comprises a partition table of the data storage device.

Example 17 includes the subject matter of any of Examples 1-16, and further including a boot option module established by a firmware environment of the computing device, the boot option module to select the operating system from a plurality of operating systems installed on the computing device; and a second policy enforcement module established by the firmware environment, the second policy enforcement module to (i) determine a second region of the data storage device to be protected based on the selected operating system and (ii) configure the data storage device to prevent access to the second region of the data storage device; wherein the boot option module is further to load the selected operating system in response to configuration of the data storage device.

Example 18 includes a computing device for media protection policy enforcement in a multiple-operating-system environment, the computing device comprising a data storage device comprising a plurality of regions; a boot option module established by a firmware environment of the computing device, the boot option module to select an operating system from a plurality of operating systems installed on the computing device; and a policy enforcement module established by the firmware environment, the policy enforcement module to (i) determine a region of a data storage device to be protected based on the selected operating system and (ii) configure the data storage device to prevent access to the region of the data storage device; wherein the boot option module is further to load the selected operating system in response to configuration of the data storage device.

Example 19 includes the subject matter of Example 18, and wherein the region of the data storage device comprises a partition of the data storage device.

Example 20 includes the subject matter of any of Examples 18 and 19, and wherein the region of the data storage device comprises a partition table of the data storage device.

Example 21 includes the subject matter of any of Examples 18-20, and wherein to determine the region of the data storage device comprises to identify a region of the data storage device that is not owned by the selected operating system.

Example 22 includes the subject matter of any of Examples 18-21, and wherein to determine the region of the data storage device comprises to determine the region as a function of a media access policy of the computing device.

Example 23 includes the subject matter of any of Examples 18-22, and wherein to determine the region as a function of the media access policy comprises to read the media access policy from a nonvolatile store of the computing device.

Example 24 includes the subject matter of any of Examples 18-23, and further including a second policy enforcement module to intercept, during execution of the selected operating system, a media access request, the media access request to specify a storage operation and a storage address; determine an identity of the selected operating system; identify a second region of the data storage device including the storage address of the media access request; and determine whether to allow the media access request as a function of the second region of the data storage device, the identity of the selected operating system, and the storage operation of the media access request.

Example 25 includes a method for media protection policy enforcement in a multiple-operating-system environment, the method comprising intercepting, by a computing device during execution of an operating system of the computing device, a media access request, the media access request specifying a storage operation and a storage address; determining, by the computing device, an identity of the operating system of the computing device; identifying, by the computing device, a region of a data storage device of the computing device including the storage address of the media access request; and determining, by the computing device, whether to allow the media access request as a function of (i) the identified region of the data storage device, (ii) the identity of the operating system, and (iii) the storage operation of the media access request.

Example 26 includes the subject matter of Example 25, and wherein determining whether to allow the media access request comprises determining whether the region of the data storage device is owned by the operating system; and determining to allow the media access request in response to determining the region is owned by the operating system.

Example 27 includes the subject matter of any of Examples 25 and 26, and wherein determining whether to allow the media access request further comprises determining not to allow the media access request in response to determining the region is not owned by the operating system.

Example 28 includes the subject matter of any of Examples 25-27, and wherein determining whether to allow the media access request further comprises determining whether to allow the media access request as a function of a media access policy of the computing device in response to determining the region is not owned by the operating system.

Example 29 includes the subject matter of any of Examples 25-28, and wherein determining whether to allow the media access request as a function of the media access policy comprises reading the media access policy from a nonvolatile store of the computing device using a firmware environment of the computing device.

Example 30 includes the subject matter of any of Examples 25-29, and wherein determining whether to allow the media access request as a function of the media access policy comprises determining whether the region of the data storage device is shared by the operating system and a second operating system, wherein the second operating system is not currently executing; and determining to allow the media access request in response to determining the region is shared.

Example 31 includes the subject matter of any of Examples 25-30, and wherein determining whether to allow the media access request as a function of the media access policy comprises determining whether to allow the media access request as a function of the storage operation of the media access request.

Example 32 includes the subject matter of any of Examples 25-31, and wherein determining whether to allow the media access request as a function of the storage operation of the media access request comprises determining to allow the media access request in response to the media access request comprising a read operation; and determining not to allow the media access request in response to the media access request comprising a write operation.

Example 33 includes the subject matter of any of Examples 25-32, and wherein determining whether to allow the media access comprises reading a media access policy from a nonvolatile store of the computing device using a firmware environment of the computing device.

Example 34 includes the subject matter of any of Examples 25-33, and wherein determining whether to allow the media access comprises determining whether media access protection is enabled as a function of the media access policy; and determining whether to allow the media access in response to determining that media access protection is enabled.

Example 35 includes the subject matter of any of Examples 25-34, and further including intercepting, by the computing device during execution of a second operating system of the computing device, a second media access request, the second media access request specifying a second storage operation and a second storage address; determining, by the computing device, an identity of the second operating system; identifying, by the computing device, a second region of the data storage device including the second storage address of the second media access request; and determining, by the computing device, whether to allow the second media access request as a function of the second region of the data storage device, the identity of the second operating system, and the second storage operation of the second media access request.

Example 36 includes the subject matter of any of Examples 25-35, and wherein intercepting the media access request comprises intercepting the media access request using a filter driver of the computing device.

Example 37 includes the subject matter of any of Examples 25-36, and further including passing, by the computing device, the media access request through to a lower-level driver of the computing device in response to determining to allow the media access request.

Example 38 includes the subject matter of any of Examples 25-37, and further including rejecting, by the computing device, the media access request in response to determining not to allow the media access request.

Example 39 includes the subject matter of any of Examples 25-38, and wherein identifying the region of the data storage device comprises identifying a partition of the data storage device.

Example 40 includes the subject matter of any of Examples 25-39, and wherein identifying the region of the data storage device comprises identifying a partition table of the data storage device.

Example 41 includes the subject matter of any of Examples 25-40, and further including loading, by the computing device, a firmware execution environment prior to execution of the operating system of the computing device; selecting, by the computing device with the firmware execution environment, the operating system from a plurality of operating systems installed on the computing device; determining, by the computing device with the firmware execution environment, a second region of the data storage device to be protected based on the selected operating system; configuring, by the computing device with the firmware execution environment, the data storage device to prevent access to the second region of the data storage device; and loading, by the computing device with the firmware execution environment, the selected operating system in response to configuring the data storage device.

Example 42 includes a method for media protection policy enforcement in a multiple-operating-system environment, the method comprising loading, by a computing device, a pre-operating-system firmware execution environment; selecting, by the computing device with the firmware execution environment, an operating system from a plurality of operating systems installed on the computing device; determining, by the computing device with the firmware execution environment, a region of a data storage device to be protected based on the selected operating system; configuring, by the computing device with the firmware execution environment, the data storage device to prevent access to the region of the data storage device; and loading, by the computing device with the firmware execution environment, the selected operating system in response to configuring the data storage device.

Example 43 includes the subject matter of Example 42, and wherein determining the region of the data storage device comprises determining a partition of the data storage device.

Example 44 includes the subject matter of any of Examples 42 and 43, and wherein determining the region of the data storage device comprises determining a partition table of the data storage device.

Example 45 includes the subject matter of any of Examples 42-44, and wherein determining the region of the data storage device comprises identifying a region of the data storage device that is not owned by the selected operating system.

Example 46 includes the subject matter of any of Examples 42-45, and wherein determining the region of the data storage device comprises determining the region as a function of a media access policy of the computing device.

Example 47 includes the subject matter of any of Examples 42-46, and wherein determining the region as a function of the media access policy comprises reading the media access policy from a nonvolatile store of the computing device.

Example 48 includes the subject matter of any of Examples 42-47, and further including intercepting, by the computing device during execution of the selected operating system, a media access request, the media access request specifying a storage operation and a storage address; determining, by the computing device, an identity of the selected operating system; identifying, by the computing device, a second region of the data storage device including the storage address of the media access request; and determining, by the computing device, whether to allow the media access request as a function of the second region of the data storage device, the identity of the selected operating system, and the storage operation of the media access request.

Example 49 includes a computing device comprising a processor; and a memory having stored therein a plurality of instructions that when executed by the processor cause the computing device to perform the method of any of Examples 25-48.

Example 50 includes one or more machine readable storage media comprising a plurality of instructions stored thereon that in response to being executed result in a computing device performing the method of any of Examples 25-48.

Example 51 includes a computing device comprising means for performing the method of any of Examples 25-48.

Example 52 includes a computing device for media protection policy enforcement in a multiple-operating-system environment, the computing device comprising means for intercepting, during execution of an operating system of the computing device, a media access request, the media access request specifying a storage operation and a storage address; means for determining an identity of the operating system of the computing device; means for identifying a region of a data storage device of the computing device including the storage address of the media access request; and means for determining whether to allow the media access request as a function of (i) the identified region of the data storage device, (ii) the identity of the operating system, and (iii) the storage operation of the media access request.

Example 53 includes the subject matter of Example 52, and wherein the means for determining whether to allow the media access request comprises means for determining whether the region of the data storage device is owned by the operating system; and means for determining to allow the media access request in response to determining the region is owned by the operating system.

Example 54 includes the subject matter of any of Examples 52 and 53, and wherein the means for determining whether to allow the media access request further comprises means for determining not to allow the media access request in response to determining the region is not owned by the operating system.

Example 55 includes the subject matter of any of Examples 52-54, and wherein the means for determining whether to allow the media access request further comprises means for determining whether to allow the media access request as a function of a media access policy of the computing device in response to determining the region is not owned by the operating system.

Example 56 includes the subject matter of any of Examples 52-55, and wherein the means for determining whether to allow the media access request as a function of the media access policy comprises means for reading the media access policy from a nonvolatile store of the computing device using a firmware environment of the computing device.

Example 57 includes the subject matter of any of Examples 52-56, and wherein the means for determining whether to allow the media access request as a function of the media access policy comprises means for determining whether the region of the data storage device is shared by the operating system and a second operating system, wherein the second operating system is not currently executing; and means for determining to allow the media access request in response to determining the region is shared.

Example 58 includes the subject matter of any of Examples 52-57, and wherein the means for determining whether to allow the media access request as a function of the media access policy comprises means for determining whether to allow the media access request as a function of the storage operation of the media access request.

Example 59 includes the subject matter of any of Examples 52-58, and wherein the means for determining whether to allow the media access request as a function of the storage operation of the media access request comprises means for determining to allow the media access request in response to the media access request comprising a read operation; and means for determining not to allow the media access request in response to the media access request comprising a write operation.

Example 60 includes the subject matter of any of Examples 52-59, and wherein the means for determining whether to allow the media access comprises means for reading a media access policy from a nonvolatile store of the computing device using a firmware environment of the computing device.

Example 61 includes the subject matter of any of Examples 52-60, and wherein the means for determining whether to allow the media access comprises means for determining whether media access protection is enabled as a function of the media access policy; and means for determining whether to allow the media access in response to determining that media access protection is enabled.

Example 62 includes the subject matter of any of Examples 52-61, and further including means for intercepting, during execution of a second operating system of the computing device, a second media access request, the second media access request specifying a second storage operation and a second storage address; means for determining an identity of the second operating system; means for identifying a second region of the data storage device including the second storage address of the second media access request; and means for determining whether to allow the second media access request as a function of the second region of the data storage device, the identity of the second operating system, and the second storage operation of the second media access request.

Example 63 includes the subject matter of any of Examples 52-62, and wherein the means for intercepting the media access request comprises means for intercepting the media access request using a filter driver of the computing device.

Example 64 includes the subject matter of any of Examples 52-63, and further including means for passing the media access request through to a lower-level driver of the computing device in response to determining to allow the media access request.

Example 65 includes the subject matter of any of Examples 52-64, and further including means for rejecting the media access request in response to determining not to allow the media access request.

Example 66 includes the subject matter of any of Examples 52-65, and wherein the means for identifying the region of the data storage device comprises means for identifying a partition of the data storage device.

Example 67 includes the subject matter of any of Examples 52-66, and wherein the means for identifying the region of the data storage device comprises means for identifying a partition table of the data storage device.

Example 68 includes the subject matter of any of Examples 52-67, and further including means for loading a firmware execution environment prior to execution of the operating system of the computing device; means for selecting, with the firmware execution environment, the operating system from a plurality of operating systems installed on the computing device; means for determining, with the firmware execution environment, a second region of the data storage device to be protected based on the selected operating system; means for configuring, with the firmware execution environment, the data storage device to prevent access to the second region of the data storage device; and means for loading, with the firmware execution environment, the selected operating system in response to configuring the data storage device.

Example 69 includes a computing device for media protection policy enforcement in a multiple-operating-system environment, the computing device comprising means for loading a pre-operating-system firmware execution environment; means for selecting, with the firmware execution environment, an operating system from a plurality of operating systems installed on the computing device; means for determining, with the firmware execution environment, a region of a data storage device to be protected based on the selected operating system; means for configuring, with the firmware execution environment, the data storage device to prevent access to the region of the data storage device; and means for loading, with the firmware execution environment, the selected operating system in response to configuring the data storage device.

Example 70 includes the subject matter of Example 69, and wherein the means for determining the region of the data storage device comprises means for determining a partition of the data storage device.

Example 71 includes the subject matter of any of Examples 69 and 70, and wherein the means for determining the region of the data storage device comprises means for determining a partition table of the data storage device.

Example 72 includes the subject matter of any of Examples 69-71, and wherein the means for determining the region of the data storage device comprises means for identifying a region of the data storage device that is not owned by the selected operating system.

Example 73 includes the subject matter of any of Examples 69-72, and wherein the means for determining the region of the data storage device comprises means for determining the region as a function of a media access policy of the computing device.

Example 74 includes the subject matter of any of Examples 69-73, and wherein the means for determining the region as a function of the media access policy comprises means for reading the media access policy from a nonvolatile store of the computing device.

Example 75 includes the subject matter of any of Examples 69-74, and further including means for intercepting, during execution of the selected operating system, a media access request, the media access request specifying a storage operation and a storage address; means for determining an identity of the selected operating system; means for identifying a second region of the data storage device including the storage address of the media access request; and means for determining whether to allow the media access request as a function of the second region of the data storage device, the identity of the selected operating system, and the storage operation of the media access request.

The invention claimed is:

1. A computing device for media protection policy enforcement in a multiple-operating-system environment, the computing device comprising:
a data storage device comprising a plurality of regions; and
a policy enforcement module to:
intercept, during execution of an operating system of the computing device, a media access request, wherein the media access request specifies a storage operation and a storage address associated with the data storage device, wherein the storage address identifies a data location within the data storage device, and wherein the operating system is executed by a processor of the computing device;
determine an identity of the operating system of the computing device;
identify a region of the data storage device that includes the data location identified by the storage address of the media access request;
access, by the operating system executed by the processor of the computing device, a runtime firmware variable interface of the computing device to read a media access policy from a nonvolatile store of the computing device, wherein the runtime firmware variable interface is installed by a pre-boot firmware environment of the computing device, and wherein the media access policy comprises a firmware variable; and
determine, by the operating system executed by the processor of the computing device, whether to allow the media access request as a function of the media access policy, wherein the media access policy defines a rule for access based on (i) the identified region of the data storage device, (ii) the identity of the operating system, and (iii) the storage operation of the media access request.

2. The computing device of claim 1, wherein to read the media access policy from the nonvolatile store of the computing device further comprises to authenticate the media access policy.

3. The computing device of claim 1, further comprising a second policy enforcement module to:
intercept, during execution of a second operating system of the computing device, a second media access request, the media access request to specify a second storage operation and a second storage address;
determine an identity of the second operating system;
identify a second region of the data storage device that includes the second storage address of the second media access request; and
determine whether to allow the second media access request as a function of the second region of the data storage device, the identity of the second operating system, and the second storage operation of the second media access request.

4. The computing device of claim 1, further comprising:
a boot option module established by the firmware environment of the computing device, the boot option module to select the operating system from a plurality of operating systems installed on the computing device; and
a second policy enforcement module established by the firmware environment, the second policy enforcement module to (i) determine a second region of the data storage device to be protected based on the selected operating system and (ii) configure the data storage device to prevent access to the second region of the data storage device;
wherein the boot option module is further to load the selected operating system in response to configuration of the data storage device.

5. The computing device of claim 1, wherein to determine whether to allow the media access request comprises to:
determine whether the region of the data storage device is owned by the operating system; and
determine to allow the media access request in response to a determination that the region is owned by the operating system.

6. The computing device of claim 5, wherein to determine whether to allow the media access request further comprises to determine not to allow the media access request in response to a determination that the region is not owned by the operating system.

7. The computing device of claim 5, wherein to determine whether to allow the media access request further comprises to determine whether to allow the media access request as a function of the media access policy of the computing device in response a determination that the region is not owned by the operating system.

8. The computing device of claim 7, wherein to determine whether to allow the media access request as a function of the media access policy comprises to:
   determine whether the region of the data storage device is shared by the operating system and a second operating system, wherein the second operating system is not to execute during the determination; and
   determine to allow the media access request in response to a determination the region is shared.

9. The computing device of claim 7, wherein to determine whether to allow the media access request as a function of the media access policy comprises to determine whether to allow the media access request as a function of the storage operation of the media access request.

10. The computing device of claim 9, wherein to determine whether to allow the media access request as a function of the storage operation of the media access request comprises to:
   determine to allow the media access request in response to the media access request comprising a read operation; and
   determine not to allow the media access request in response to the media access request comprising a write operation.

11. One or more computer-readable storage media comprising a plurality of instructions that in response to being executed cause a computing device to:
   intercept, during execution of an operating system of the computing device, a media access request, the media access request specifying a storage operation and a storage address associated with a data storage device of the computing device, wherein the storage address identifies a data location within the data storage device, and wherein the operating system is executed by a processor of the computing device;
   determine an identity of the operating system of the computing device;
   identify a region of the data storage device of the computing device including the data location identified by the storage address of the media access request;
   access, by the operating system executed by the processor of the computing device, a runtime firmware variable interface of the computing device to read a media access policy from a nonvolatile store of the computing device, wherein the runtime firmware variable interface is installed by a pre-boot firmware environment of the computing device, and wherein the media access policy comprises a firmware variable; and
   determine, by the operating system executed by the processor of the computing device, whether to allow the media access request as a function of the media access policy, wherein the media access policy defines a rule for access based on (i) the identified region of the data storage device, (ii) the identity of the operating system, and (iii) the storage operation of the media access request.

12. The one or more computer-readable storage media of claim 11, wherein to read the media access policy from the nonvolatile store of the computing device further comprises to authenticate the media access policy.

13. The one or more computer-readable storage media of claim 11, further comprising a plurality of instructions that in response to being executed cause the computing device to:
   intercept, during execution of a second operating system of the computing device, a second media access request, the second media access request specifying a second storage operation and a second storage address;
   determine an identity of the second operating system;
   identify a second region of the data storage device including the second storage address of the second media access request; and
   determine whether to allow the second media access request as a function of the second region of the data storage device, the identity of the second operating system, and the second storage operation of the second media access request.

14. The one or more computer-readable storage media of claim 11, further comprising a plurality of instructions that in response to being executed cause the computing device to:
   load a firmware execution environment prior to execution of the operating system of the computing device;
   select, with the firmware execution environment, the operating system from a plurality of operating systems installed on the computing device;
   determine, with the firmware execution environment, a second region of the data storage device to be protected based on the selected operating system;
   configure, with the firmware execution environment, the data storage device to prevent access to the second region of the data storage device; and
   load, with the firmware execution environment, the selected operating system in response to configuring the data storage device.

15. The one or more computer-readable storage media of claim 11, wherein to determine whether to allow the media access request comprises to:
   determine whether the region of the data storage device is owned by the operating system;
   determine to allow the media access request in response to determining the region is owned by the operating system; and
   determine whether to allow the media access request as a function of the media access policy of the computing device in response to determining the region is not owned by the operating system.

16. The one or more computer-readable storage media of claim 15, wherein to determine whether to allow the media access request as a function of the media access policy comprises to determine whether to allow the media access request as a function of the storage operation of the media access request.

17. A method for media protection policy enforcement in a multiple-operating-system environment, the method comprising:
   intercepting, by a computing device during execution of an operating system of the computing device, a media access request, the media access request specifying a storage operation and a storage address associated with a data storage device of the computing device, wherein the storage address identifies a data location within the data storage device, and wherein the operating system is executed by a processor of the computing device;
   determining, by the computing device, an identity of the operating system of the computing device;
   identifying, by the computing device, a region of the data storage device of the computing device including the data location identified by the storage address of the media access request;
   accessing, by the operating system executed by the processor of the computing device, a runtime firmware variable interface of the computing device to read a media access policy from a nonvolatile store of the computing device, wherein the runtime firmware variable interface is installed by a pre-boot firmware environment of the computing device, and wherein the media access policy comprises a firmware variable; and determining, by the operating system executed by the processor of the computing device, whether to allow the media access request as a function of the media access policy, wherein the media access policy defines a rule for access based on (i) the identified region of the data storage device, (ii) the identity of the operating system, and (iii) the storage operation of the media access request.

18. The method of claim 17, further comprising:

intercepting, by the computing device during execution of a second operating system of the computing device, a second media access request, the second media access request specifying a second storage operation and a second storage address;

determining, by the computing device, an identity of the second operating system;

identifying, by the computing device, a second region of the data storage device including the second storage address of the second media access request; and determining, by the computing device, whether to allow the second media access request as a function of the second region of the data storage device, the identity of the second operating system, and the second storage operation of the second media access request.

19. The method of claim 17, further comprising:

loading, by the computing device, a firmware execution environment prior to execution of the operating system of the computing device;

selecting, by the computing device with the firmware execution environment, the operating system from a plurality of operating systems installed on the computing device;

determining, by the computing device with the firmware execution environment, a second region of the data storage device to be protected based on the selected operating system;

configuring, by the computing device with the firmware execution environment, the data storage device to prevent access to the second region of the data storage device; and loading, by the computing device with the firmware execution environment, the selected operating system in response to configuring the data storage device.

20. The method of claim 17, wherein determining whether to allow the media access request comprises:

determining whether the region of the data storage device is owned by the operating system; and determining to allow the media access request in response to determining the region is owned by the operating system.

21. The method of claim 20, wherein determining whether to allow the media access request further comprises determining not to allow the media access request in response to determining the region is not owned by the operating system.

22. The method of claim 20, wherein determining whether to allow the media access request further comprises determining whether to allow the media access request as a function of the media access policy of the computing device in response to determining the region is not owned by the operating system.

23. The method of claim 22, wherein determining whether to allow the media access request as a function of the media access policy comprises:

determining whether the region of the data storage device is shared by the operating system and a second operating system, wherein the second operating system is not currently executing; and determining to allow the media access request in response to determining the region is shared.

24. The method of claim 22, wherein determining whether to allow the media access request as a function of the media access policy comprises determining whether to allow the media access request as a function of the storage operation of the media access request.

25. The method of claim 24, wherein determining whether to allow the media access request as a function of the storage operation of the media access request comprises:

determining to allow the media access request in response to the media access request comprising a read operation; and determining not to allow the media access request in response to the media access request comprising a write operation.

* * * * *